Aug. 2, 1927.

F. G. PARNELL 1,637,349

RELAY MECHANISM FOR VEHICLE BRAKES

Filed Oct. 21, 1926

Frank Gorden Parnell,
Inventor.

by
his Attorney

Patented Aug. 2, 1927.

1,637,349

UNITED STATES PATENT OFFICE.

FRANK GORDON PARNELL, OF COVENTRY, ENGLAND, ASSIGNOR OF ONE-HALF TO TRIUMPH CYCLE COMPANY LIMITED, OF COVENTRY, ENGLAND, A BRITISH COMPANY.

RELAY MECHANISM FOR VEHICLE BRAKES.

Application filed October 21, 1926, Serial No. 143,214, and in Great Britain April 12, 1926.

This invention relates to relay mechanism for vehicle brakes, of the kind which comprises a cylinder and a piston therein actuated from a fluid circulatory system whose pressure is built up by obstructing the flow in accordance with variations in the braking force as applied in the usual manner through the brake pedal or the hand lever and also transmitted thereby to a valve controlling the circulatory system.

A construction has previously been proposed in which the fluid was controlled by a valve mounted within the piston and having a hollow stem extending through the end of the cylinder and connected to the pump by a conduit. The fluid entered the cylinder through a hollow piston rod and made its exit through the hollow valve stem.

The principal object of the invention is to provide an improved method of mounting and actuating the valve, and thus controlling the relay effect whilst ensuring that the reaction upon the brake applying device increases with the magnitude of the relay effect obtained.

Figure 1:
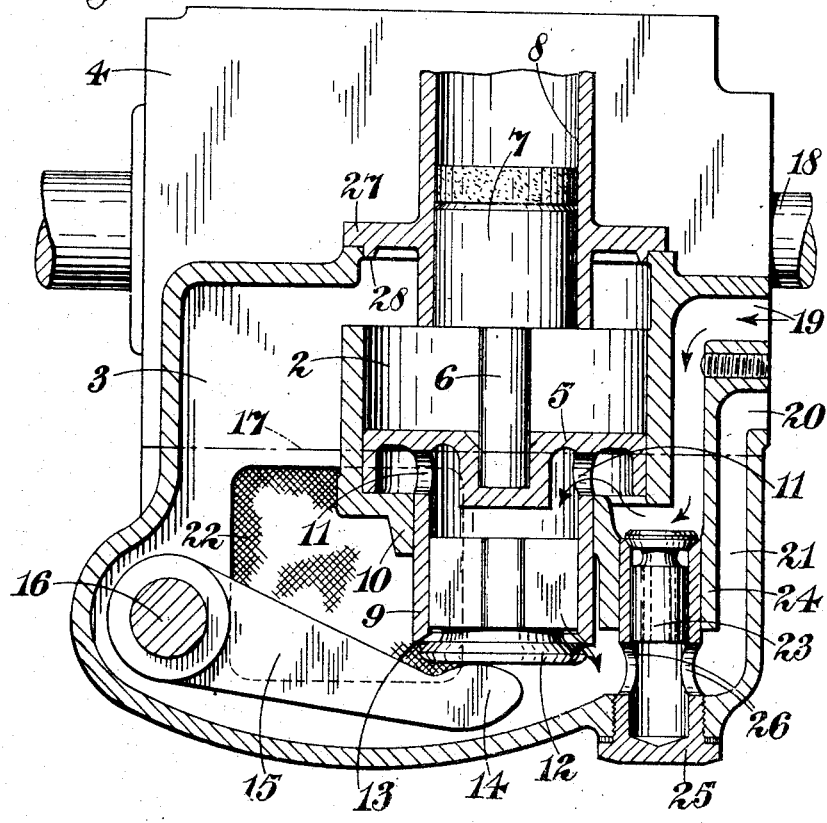
Figure 2:
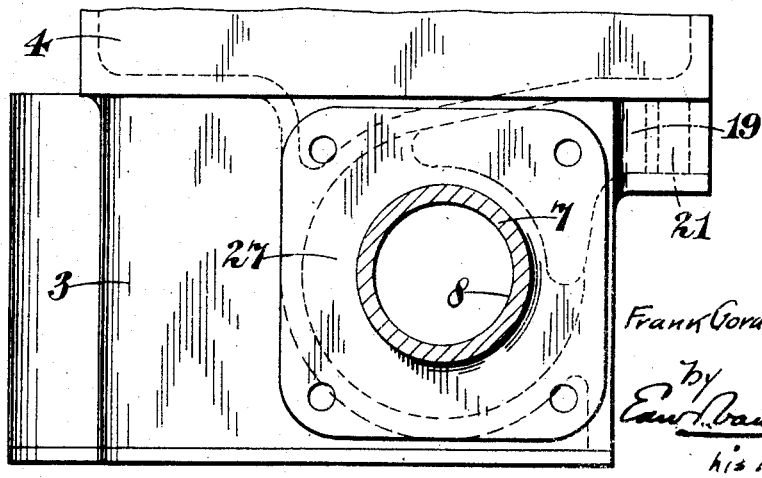

In the accompanying drawings, which show a preferred method of carrying out the invention, Figure 1 is a sectional elevation taken on the axial line of the relay cylinder, and Figure 2 is a plan view.

The relay cylinder 2 is located within a compartment 3 forming a lateral extension of a casing 4 containing the change speed transmission mechanism of the vehicle.

In this example the brakes are operated hydraulically and the relay piston 5 is directly connected by a piston rod 6 with a smaller piston 7 operating in a cylinder 8 coaxial with the cylinder 2 and constituting part of the hydraulic system, details of which form no part of the present invention.

The relay piston 5 has a tubular extension 9 extending slidably through the end wall 10 of the cylinder 2, the nature of the sliding fit being such as to provide freedom of movement without undue leakage of pressure fluid from the cylinder. Around the tubular extension 9 and close to its junction with the piston 5 are provided one or more ports 11 through which the working fluid can flow from the cylinder into the extension.

At the open end of the tubular extension 9 is provided a disc or wing valve 12 which seats at 13 around the end of the extension, and this valve is acted on by the toe 14 of a lever 15 mounted fast on a spindle 16 directly or indirectly connected with the brake lever or pedal (not shown) so that, when a braking pressure is applied, the effect is to thrust the valve on its seating 13.

The end of the cylinder 2, together with the tubular extension 9, valve 12, and the lever 15 which actuates the latter, are submerged in the oil or other fluid employed in the relay motor, the fluid level being indicated by the chain line 17. The circulatory pump (not shown) is positively driven by the shaft 18 at the rear end of the gear box, this shaft being in permanent connection with the rear driving wheels of the vehicle so that it is always in operation when the vehicle is in motion. The pump may be contained in a separately formed casing which is bolted on to the end of the gear box and its delivery port registers with the relay cylinder inlet port 19, whilst its suction port registers with the lower port 20 communicating, by the downward passage 21, with the lower part of the compartment 3 containing the operating fluid, which in this case is the lubricating oil ordinarily supplied to the change speed gear box. For this purpose, therefore, there is a passage 22 connecting the compartment 3 with the interior of the gear box 4 and provided with a filtering screen across it. The arrangement, therefore, is such that when the gear box is charged with lubricant a portion enters the compartment 3 containing the relay cylinder, and the latter is properly submerged as above described, or conversely, the oil can be supplied into the compartment for the cylinder and thereby the supply to the gear box is ensured also.

In the operation of the relay device, it will be apparent that as long as the valve 12 at the end of the extension 9 remains open, the oil discharged from the circulating pump will, as shown by the arrows, flow through the end wall of the cylinder into the clearance space between the piston and the end of the cylinder 2, thence through the piston extension 9, and past the valve 12 into the lower part of the compartment 3 from which the pump draws its supply. When pressure is applied to the brake lever or pedal, the valve 12 is thrust towards its seat, and the pressure in the cylinder rises correspondingly and operates the relay piston 5 to apply the brakes. Obviously also, the relative areas of the valve 12 and of the piston 5 will determine the ratio of reaction pressure exerted upon the brake pedal or the like, and this will be at all times proportional to the relay effect obtained.

In the event of any failure of the relay mechanism, the brakes can still be actuated by the usual lever or pedal, and it will be seen that as the effort of either is applied through the valve 12 direct to the piston 5, the whole mechanism is very simple and avoids intermediate joints which could develop wear and lost motion. Also one set of transmission mechanism between the piston and the brakes suffices both for the relay and for the usual applying member, whether pedal or lever.

In the example above described, the flow of the circulatory fluid is unidirectional, and as a consequence will reverse when the direction of the vehicle is reversed, but this is immaterial as the brakes can still be used in the ordinary manner. During such reverse movement, however, suction would take place through the port 19 and delivery through the port 20, and to provide for this there is a non-return valve 23 which connects the suction and delivery side and opens to allow a free reversed circulation. This valve may be mounted in a tubular casing 24 extending from a removable plug 25 which serves as a drain for the lower part of the compartment 3. The tubular casing is perforated at its lower part as shown at 26 to allow the fluid to reach the valve.

To give ready access to the interior of the compartment 3 for assembly or examination of the parts of the relay motor, it is provided with a detachable cover 27 with which the hydraulic cylinder 8 is integrally formed, and a register 28 is provided on the cover, thereby ensuring accurate alignment of the cylinders 8 and 2.

The foregoing arrangement provides a simple and accessible method of mounting the valve, and it avoids the use of any flexible connections and moving joints for the connection of the suction and discharge conduits respectively communicating with the relay cylinder.

Furthermore, the mounting of the control valve upon the piston of the relay motor very considerably simplifies the operative connection between the brake lever or pedal and the valve, and also it provides for a very direct application of the braking force should the relay effect fail through any cause. In this connection it is important to observe that although a preferred arrangement is to employ the relay piston to transmit its effort hydraulically to the brakes, yet they might equally well be mechanically operated by the use of an appropriate link mechanism actuated by the relay piston. The arrangement illustrated is, however, very simple and compact, having but few parts. Risk of insufficient oil for circulation purposes is avoided through the combination of the reserve supply contained in the compartment 3 with the contents of the change speed gear box.

What I claim as my invention and desire to secure by Letters Patent of the United States is:—

1. In brake relay mechanism, the combination of a cylinder through which fluid is adapted to be circulated, a piston therein operatively connected with the brake and having a portion projecting outside the working part of said cylinder, an inlet port for said fluid in the wall of said cylinder, an exit port for said fluid in that part of said piston which projects outside said cylinder, a valve controlling said exit port, and means for regulating exit therefrom of said fluid by movement of said valve, substantially as set forth.

2. In brake relay mechanism, the combination of a cylinder through which fluid is adapted to be circulated, a piston therein operatively connected with the brake, a tubular extension of said piston projecting beyond said cylinder end, an inlet port for said fluid in the wall of said cylinder, a passage connecting the interior of said cylinder with the interior of said tubular extension, an exit port for said fluid in said extension, a valve adapted to regulate said exit port, and means forming part of a brake applying device for controlling the opening of said valve, substantially as set forth.

3. Brake relay mechanism as claimed in claim 2, in which the tubular projection discharges freely into a compartment from which the circulatory fluid is withdrawn by the pump, substantially as set forth.

4. Brake relay mechanism as claimed in claim 2, in which the tubular projection extends slidably through the end of the cylinder and communicates with the interior of the latter through a port adjacent its junction with the piston, substantially as set forth.

5. Brake relay mechanism as claimed in claim 2, in which the valve is slidably mounted in the tubular projection and seats around the edge of the latter, substantially as set forth.

6. Brake relay mechanism as claimed in claim 1, in which the cylinder is arranged with its axis vertical and is mounted in a compartment containing a reserve of circulatory fluid and also adapted to enclose the control valve and its associated actuating mechanism, substantially as set forth.

In testimony whereof I have signed my name to this specification.

FRANK GORDON PARNELL.